（12）United States Patent
Kawanaka et al.

(10) Patent No.: US 11,784,721 B2
(45) Date of Patent: Oct. 10, 2023

(54) RECEPTION DEVICE

(71) Applicant: Mitsubishi Electric Corporation, Tokyo (JP)

(72) Inventors: Takanori Kawanaka, Tokyo (JP); Hiroyuki Ozaki, Tokyo (JP); Yusuke Mitsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 9 days.

(21) Appl. No.: 17/634,246

(22) PCT Filed: Aug. 20, 2020

(86) PCT No.: PCT/JP2020/031390
§ 371 (c)(1),
(2) Date: Feb. 10, 2022

(87) PCT Pub. No.: WO2021/039560
PCT Pub. Date: Mar. 4, 2021

(65) Prior Publication Data
US 2022/0345225 A1    Oct. 27, 2022

(30) Foreign Application Priority Data

Aug. 27, 2019  (WO) .................. PCT/JP2019/033492

(51) Int. Cl.
*H04B 10/69*       (2013.01)
*H04B 10/079*      (2013.01)

(52) U.S. Cl.
CPC ....... *H04B 10/697* (2013.01); *H04B 10/0795* (2013.01); *H04B 10/693* (2013.01); *H04B 10/691* (2013.01)

(58) Field of Classification Search
CPC .............. H04B 10/0795; H04B 10/697; H04B 10/6936

(Continued)

(56) References Cited

U.S. PATENT DOCUMENTS 4,379,986 A     4/1983  Baxter et al.
7,330,670 B2 *  2/2008  Doh ..................... H03G 3/3047
                                              398/209

(Continued)

FOREIGN PATENT DOCUMENTS

EP          1315317 A2 *  5/2003  ........... H04B 10/077
JP          H05-250978 A   9/1993

(Continued)

OTHER PUBLICATIONS

Joris et al; 90-GB/s NRZ Optical Receiver in Silicon Using a Fully Differential Transimpedance Amplifier; Journal of light wave technology, vol. 37, No. 9, May 2019; pp. 1-10. (Year: 2019).*

(Continued)

*Primary Examiner* — Amritbir K Sandhu
(74) *Attorney, Agent, or Firm* — XSENSUS LLP

(57) ABSTRACT

A reception device includes a measurement unit that measures a first number of times for which a first phase and a first reverse phase based on a differential signal obtained by amplifying a signal based on noise intersect with each other, the first reverse phase being a reverse phase of the first phase, an oscillator that transmits a first signal, a comparison unit that compares the first number of times with a predetermined first reference value, and a signal output unit that outputs a second signal indicating that an optical signal has been received when the first number of times and the first reference value coincide with each other. The measurement unit resets the first number of times when the first signal is received.

8 Claims, 10 Drawing Sheets

(58) Field of Classification Search
USPC .......................................................... 398/208
See application file for complete search history.

(56) References Cited

U.S. PATENT DOCUMENTS

| | | | | |
|---|---|---|---|---|
| 7,635,837 | B2* | 12/2009 | Uo | ........................ H03F 3/087 |
| | | | | 250/214 R |
| 9,083,466 | B2* | 7/2015 | Yoshima | ............ H04B 10/6931 |
| 2010/0086315 | A1* | 4/2010 | Tanaka | ............ H04B 10/07955 |
| | | | | 398/208 |
| 2010/0272448 | A1* | 10/2010 | Kubo | ................... H03G 3/3084 |
| | | | | 398/202 |
| 2022/0109507 | A1* | 4/2022 | Tanaka | ................ H04B 10/693 |

FOREIGN PATENT DOCUMENTS

| | | | |
|---|---|---|---|
| JP | 2011-166656 A | | 8/2011 |
| JP | 2016-63345 A | | 4/2016 |
| JP | 2016063345 A | * | 4/2016 |
| WO | WO-2011099598 A1 | * | 8/2011 ............. H04B 10/69 |

OTHER PUBLICATIONS

International Search Report and Written Opinion dated Nov. 10, 2020, received for PCT Application PCT/JP2020/031390, Filed on Aug. 20, 2020, 12 pages including English Translation.
Extended European search report dated Sep. 23, 2022, in corresponding European patent Application No. 20856007.8, 11 pages.
Office Action dated Oct. 11, 2022, in corresponding Japanese patent Application No. 2021-542798, 6 pages.

* cited by examiner

RECEPTION DEVICE

CROSS-REFERENCE TO RELATED APPLICATIONS

The present application is based on PCT filing PCT/JP2020/031390, filed Aug. 20, 2020, which is based on PCT filing PCT/JP2019/033492, filed Aug. 27, 2019, the entire contents of each are incorporated herein by reference.

TECHNICAL FIELD

The present disclosure relates to a reception device.

BACKGROUND ART

There has been known a Passive Optical Network (PON) system that is an optical communication system. The PON system includes an optical communication device (referred to also as a master station device) installed in a station of a telecommunications carrier and a plurality of optical communication devices (referred to also as slave station devices) on the subscribers' side (referred to also as slave stations' side). The master station device is referred to as an Optical Line Termination (OLT). The slave station device is referred to as an Optical Network Unit (ONU).

The number of devices included in a PON system is increasing. Thus, it is being required to increase the distance between the OLT and each ONU and increase the number of branches in the network. Satisfying such requirements leads to non-constant distance between the OLT and each ONU. Besides, the OLT has to receive packet signals having great signal intensity variations.

Further, in the PON system, realizing an increase in the transmission rate is being requested. Furthermore, in the PON system, realizing a new system capable of accommodating the existing system is being requested.

The OLT receives optical signals from the ONUs. Here, a device for receiving optical signals has been proposed (see Patent Reference 1). This device includes a photodiode, a pre-amplifier and a reception circuit, for example. The photodiode transduces an optical signal transmitted via an optical fiber into an electric signal. The pre-amplifier amplifies the electric signal. The reception circuit includes a main amplifier and an SR-type flip-flop circuit. The main amplifier limits an output signal outputted from the pre-amplifier to a constant voltage amplitude signal. The SR-type flip-flop circuit outputs a Signal Detect (SD) signal. The SD signal may be regarded as a signal indicating that an optical signal as a main signal has been detected. Here, detecting an optical signal is referred to as SD detection. Further, a circuit like the SR-type flip-flop circuit is referred to as an SD circuit.

Even in a state in which no optical signal is inputted to the photodiode as in a no-signal interval, the pre-amplifier outputs a signal based on random noise. The noise can generally be represented by the normal distribution. Further, due to the amplification of the signal based on the noise by the main amplifier, the SD circuit erroneously outputs the SD signal.

As mentioned above, the reception circuit is required to have the function of detecting the reception of an optical signal. Here, this function is referred to also as an SD function. The SD function may be regarded as "not erroneously outputting the SD signal when noise is acquired" and "outputting the SD signal when an optical signal within a predetermined power range is received". Incidentally, the power range is −26 dBm to −10 dBm, for example. Especially, achieving both "not erroneously outputting the SD signal when noise is acquired" and "outputting the SD signal when an optical signal at power lowest in the power range is received" is necessary. Incidentally, the lowest power is −26 dBm, for example. In order to realize such achievement of both conditions, the Patent Reference 1 describes the following features, for example: In the first feature, a difference is caused between Direct Current (DC) voltages of a normal phase of a signal and a reverse phase of the signal, and the SD signal is outputted due to intersection of the normal phase and the reverse phase. Incidentally, the difference in the DC voltage is referred to also as an offset voltage. The second feature is that the frequency of erroneously outputting the SD signal when noise is acquired (hereinafter referred to as an SD false detection frequency) can be reduced by the offset voltage. For example, the SD false detection frequency can be reduced by increasing the offset voltage. However, increasing the offset voltage also increases the amplitude at the time of detecting an optical signal, and thus the normal phase and the reverse phase based on an optical signal having power close to minimum reception sensitivity cannot intersect with each other. Consequently, the outputting of the SD signal will never occur. Therefore, in the third feature, the reception circuit includes a counter circuit in order to further reduce the SD false detection frequency. When a count counted by the counter circuit exceeds a predetermined number, the SD circuit outputs the SD signal. Incidentally, when the count is less than the number, the SD circuit does not output the SD signal.

PRIOR ART REFERENCE

Patent Reference

Patent Reference 1: Japanese Patent Application Publication No. 2016-63345

SUMMARY OF THE INVENTION

Problem to be Solved by the Invention

Incidentally, the Signal-to-Noise Ratio (SNR) in an OLT included in a PON system performing high-speed transmission is lower than the SNR in an OLT included in a PON system performing low-speed transmission due to restriction on frequency characteristics of the photodiode. Therefore, it is necessary to reduce the offset voltage. However, reducing the offset voltage leads to a higher SD false detection frequency. Thus, "outputting the SD signal when an optical signal within a predetermined power range is received" cannot be realized. Here, it is possible to consider a method of reducing the SD false detection frequency by using a counter circuit. First, the cycle of the intersection of the normal phase and the reverse phase in a case where no counter circuit exists and noise is acquired is assumed to be A seconds. The SD false detection frequency in this case is "1/A". Here, the denominator of "1/A" is referred to as a false detection time. Next, a case where the counter circuit exists and noise is acquired will be considered. Here, the condition for outputting the SD signal is set as N intersections of the normal phase and the reverse phase. The time it takes for N intersections of the normal phase and the reverse phase is "N×A" seconds. Thus, the SD false detection frequency in this case is "1/(N×A)". As above, by increasing the false detection time to N times, the SD false detection frequency is decreased to "1/N" times.

As described above, by employing the counter circuit, the false detection time is increased without reducing the offset voltage. Here, in the case where the false detection time is increased to N times, the count increases to N times. Due to the increase in the count to N times, an SD detection time, as a time for which the SD detection is performed erroneously, also increases. For example, the offset voltage necessary for the SD detection is assumed to be B [mV]. The false detection time in this case is assumed to be 10 seconds. When the false detection time is desired to be set to 1 year (approximately $3\times10^7$ seconds) or longer, the count N1 is $3\times10^6$ (=$3\times10^7/10$). Here, the SD detection time when the count is 1 is assumed to be 1 ns (nanosecond). If this count is multiplied by $3\times10^6$, the SD detection time is $3\times10^{-3}$ seconds (3 milliseconds). A time range that is considered to be permissible as the SD detection time is a microsecond. Accordingly, 3 milliseconds is not included in the permissible time range. Therefore, it is difficult to lower the SD false detection frequency by the method increasing the false detection time to N times by using the counter circuit.

An object of the present disclosure is to lower the SD false detection frequency.

Means for Solving the Problem

A reception device according to an aspect of the present disclosure is provided. The reception device includes a measurement unit that measures a first number of times for which a first phase and a first reverse phase based on a differential signal obtained by amplifying a signal based on noise intersect with each other, the first reverse phase being a reverse phase of the first phase, an oscillator that transmits a first signal, a comparison unit that compares the first number of times with a predetermined first reference value, and a signal output unit that outputs a second signal indicating that an optical signal has been received when the first number of times and the first reference value coincide with each other. The measurement unit resets the first number of times when the first signal is received.

Effects of the Invention

According to the present disclosure, the SD false detection frequency can be lowered.

MODE FOR CARRYING OUT THE INVENTION

Embodiments will be described below with reference to the drawings. The following embodiments are just examples and a variety of modifications are possible within the scope of the present disclosure.

First Embodiment

Figure 1:
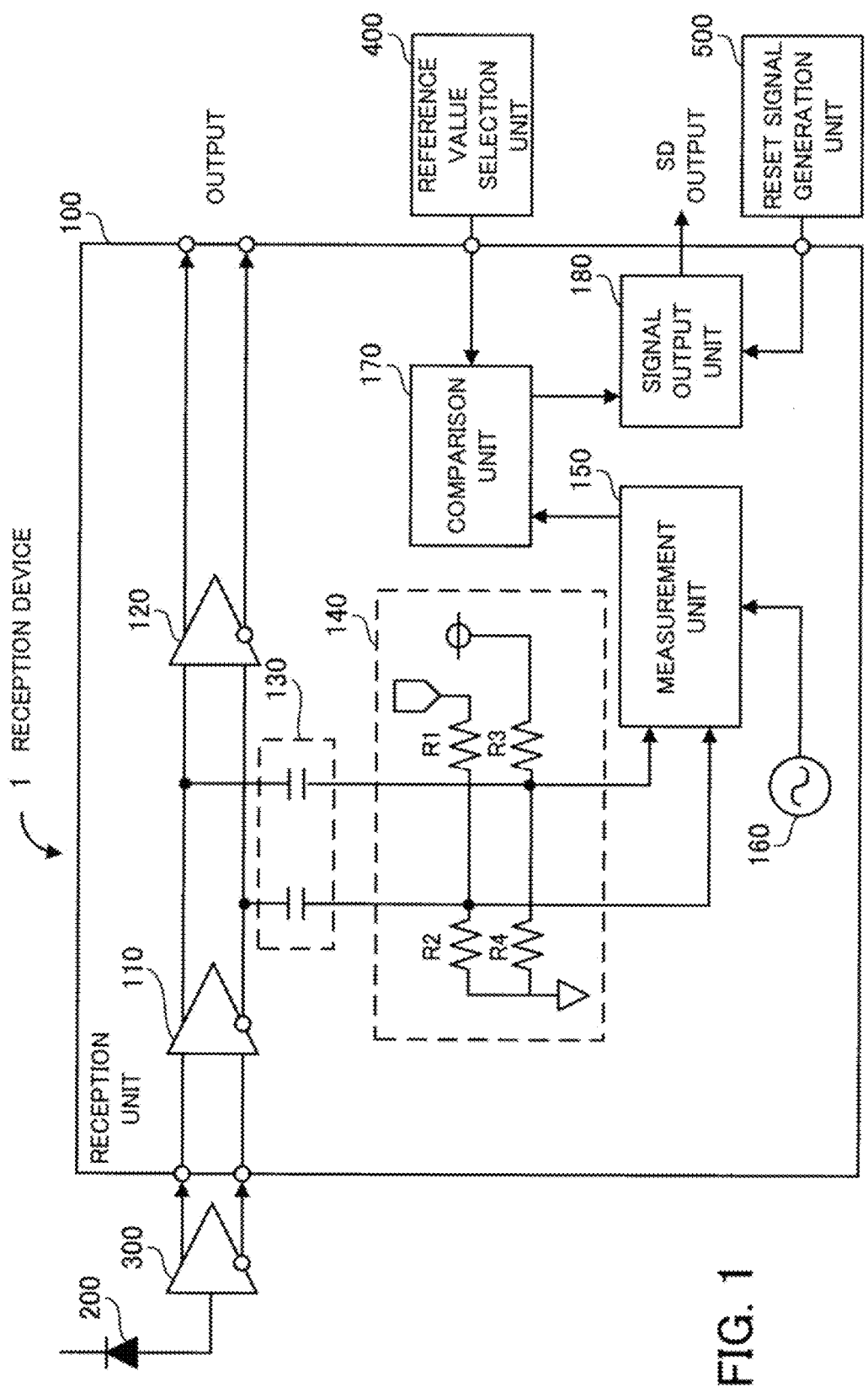
FIG. 1 is a functional block diagram showing the configuration of a reception device in a first embodiment.

FIG. 1 is a functional block diagram showing the configuration of a reception device in a first embodiment. The reception device 1 includes a reception unit 100, a photodiode 200, a pre-amplifier 300, a reference value selection unit 400 and a reset signal generation unit 500. Incidentally, the reference value selection unit 400 may be represented as a count reference value selection circuitry. Further, the reset signal generation unit 500 may be represented as a reset signal generation circuitry. Furthermore, the reception device 1 may be regarded as an OLT. The reception device 1 may be referred to as a false detection frequency reducing device.

First, the photodiode 200 and the pre-amplifier 300 will be described below. The photodiode 200 is referred to also as a photoelectric transducing element. The photodiode 200 receives an optical signal. The photodiode 200 outputs an electric signal corresponding to the optical signal. The pre-amplifier 300 is referred to also as a Trance Impedance Amplifier (TIA). Further, the pre-amplifier 300 is referred to also as a preamp. The pre-amplifier 300 converts a current signal into a voltage signal. The voltage signal obtained by the conversion is amplified by the reception unit 100. The reception unit 100 outputs the amplified voltage signal to an external circuit. There are cases where the pre-amplifier 300 outputs a signal based on noise.

Next, the reception unit 100 will be described below. The reception unit 100 includes a differential amplifier 110, a buffer amplifier 120, a first generation unit 130, a second generation unit 140, a measurement unit 150, an oscillator 160, a comparison unit 170 and a signal output unit 180.

Here, the first generation unit 130 may be represented as Alternating current (AC) coupling capacitance. The second generation unit 140 may be represented as a variable bias circuitry. The measurement unit 150 may be represented as a crossing count counter circuitry. The comparison unit 170 may be represented as a comparator. The signal output unit 180 may be represented as a DFF-type SD circuitry. As above, the first generation unit 130, the second generation unit 140, the measurement unit 150, the comparison unit 170 and the signal output unit 180 can be implemented by processing circuitries. Incidentally, the measurement unit 150 may be referred to as a counter.

The differential amplifier 110 may be regarded as a low-noise high-frequency differential amp. The differential amplifier 110 receives a signal based on the optical signal received by the photodiode 200 via the pre-amplifier 300. Further, the differential amplifier 110 receives the signal based on the noise from the pre-amplifier 300.

The function of the differential amplifier 110 will be described in detail below. The differential amplifier 110 amplifies the voltage signal outputted by the pre-amplifier 300. The differential amplifier 110 outputs a differential signal obtained by amplifying the voltage signal. Here, the differential signal is a signal obtained by amplifying the signal based on the optical signal, or a signal obtained by amplifying the signal based on the noise, for example. Here, the differential signal is referred to as a first differential signal. Incidentally, a part of the first differential signal outputted by the differential amplifier 110 is inputted to the first generation unit 130. The buffer amplifier 120 regulates the first differential signal at constant amplitude.

Next, the first generation unit 130, the second generation unit 140, the measurement unit 150, the oscillator 160, the comparison unit 170 and the signal output unit 180 will be described below by using FIG. 2.

Figure 2:
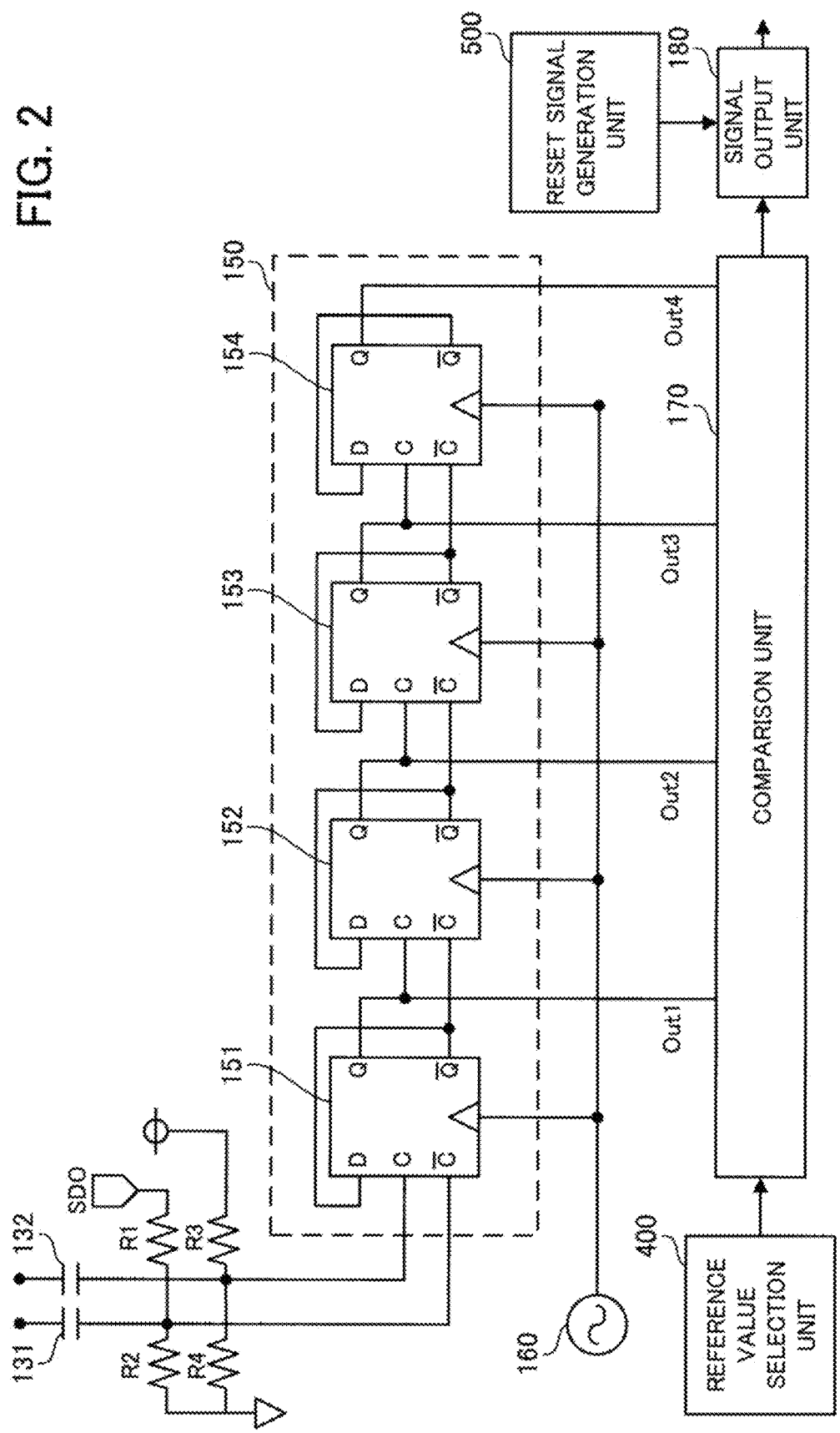
FIG. 2 is a diagram mainly showing the configuration of a measurement unit in the first embodiment.

FIG. 2 is a diagram mainly showing the configuration of the measurement unit in the first embodiment.

The first generation unit 130 includes capacitors 131 and 132. The capacitors 131 and 132 let through high frequency components only. Here, the first differential signal includes a signal of a certain phase and a signal of a reverse phase as inversion of the phase. For example, the signal of the phase is inputted to the capacitor 131. The signal of the reverse phase is inputted to the capacitor 132.

Here, the phase based on the first differential signal obtained by amplifying the signal based on the noise is referred to also as a first phase. The first phase may be represented as a first normal phase. The reverse phase based on the first differential signal obtained by amplifying the signal based on the noise is referred to also as a first reverse phase. The first reverse phase is the reverse phase of the first phase. Further, the phase based on the first differential signal obtained by amplifying the signal based on the optical signal is referred to also as a second phase. The second phase may be represented as a second normal phase. The reverse phase based on the first differential signal obtained by amplifying the signal based on the optical signal is referred to also as a second reverse phase. The second reverse phase is the reverse phase of the second phase.

The first generation unit 130 removes a DC component included in the first differential signal. The first differential signal from which the DC component has been removed is referred to also as a second differential signal. As above, the first generation unit 130 generates the second differential signal by removing the DC component included in the first differential signal.

The second generation unit 140 includes a power supply and a plurality of resistors. Resistors R1 and R2 form a voltage dividing circuit. Resistance values of the resistors R1 and R2 can be changed from the outside. A power supply voltage is divided for resistors R3 and R4. The second generation unit 140 generates a third differential signal by applying a predetermined voltage to the second differential signal. The third differential signal may be represented as a detection-dedicated differential signal.

The measurement unit 150 includes flip-flop circuits 151, 152, 153 and 154. The measurement unit 150 measures the number of times of intersection of the phase and the reverse phase based on the third differential signal. This sentence may also be expressed as follows: The measurement unit 150 measures the number of times of intersection of the signal of the phase and the signal of the reverse phase included in the third differential signal. Put another way, the measurement unit 150 measures the number of times of intersection of a waveform of the phase and a waveform of the reverse phase included in the third differential signal. Here, the number of times measured by the measurement unit 150 is referred to also as a first number of times or a second number of times.

The flip-flop circuit 151 outputs an output signal Out1 when the phase and the reverse phase have intersected twice. The flip-flop circuit 152 outputs an output signal Out2 when the phase and the reverse phase have intersected four times. The flip-flop circuit 153 outputs an output signal Out3 when the phase and the reverse phase have intersected eight times. The flip-flop circuit 154 outputs an output signal Out4 when the phase and the reverse phase have intersected sixteen times.

The comparison unit 170 is capable of detecting the number of times of intersection of the phase and the reverse phase by receiving the output signals outputted by the measurement unit 150. The number of times detected by the comparison unit 170 is the same as the number of times measured by the measurement unit 150. The number of times measured by the measurement unit 150 will hereinafter be referred to as a count number.

The oscillator 160 periodically transmits a signal for resetting the count number. This signal is referred to also as a first signal or a third signal.

Here, concrete examples of the case where the count number is reset will be shown below.

Figure 3:
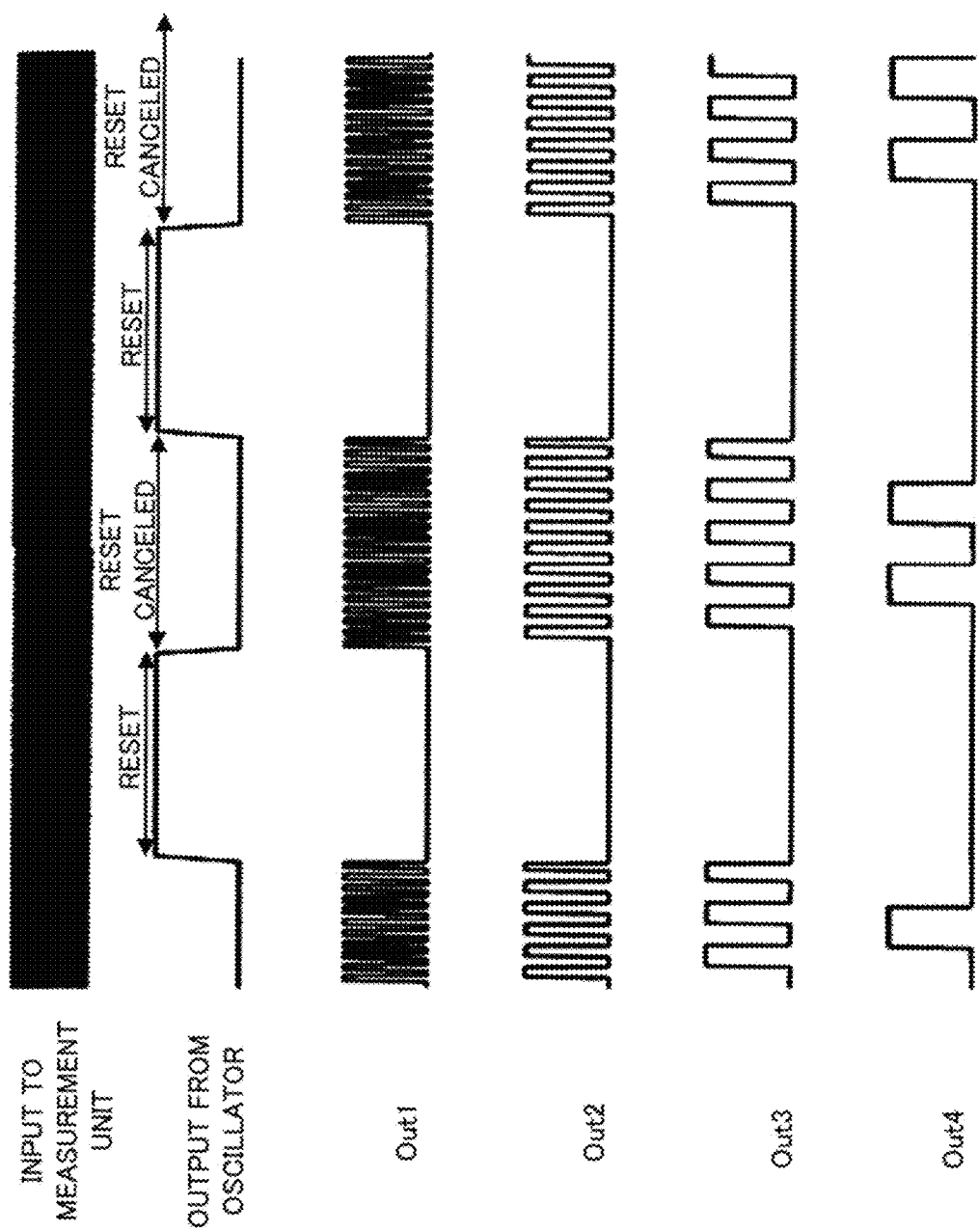
FIG. 3 shows a concrete example (No. 1) of a case where a count number is reset in the first embodiment.

FIG. 3 shows a concrete example (No. 1) of the case where the count number is reset in the first embodiment. The concrete example shown in FIG. 3 is a case where an optical signal is inputted to the photodiode 200.

FIG. 3 indicates that the third differential signal based on the optical signal is inputted to the measurement unit 150. Further, FIG. 3 indicates that the measurement unit 150 outputs the output signal Out1, the output signal Out2, the output signal Out3 and the output signal Out4.

FIG. 3 indicates that the oscillator 160 transmits the signal for resetting the count number. For example, the measurement unit 150 resets the count number when the signal transmitted by the oscillator 160 is High. As above, when the measurement unit 150 receives the signal transmitted by the oscillator 160, the measurement unit 150 sets the count number at 0. After the interval in which the signal transmitted by the oscillator 160 is High ends, the measurement unit 150 starts the measurement.

Figure 4:
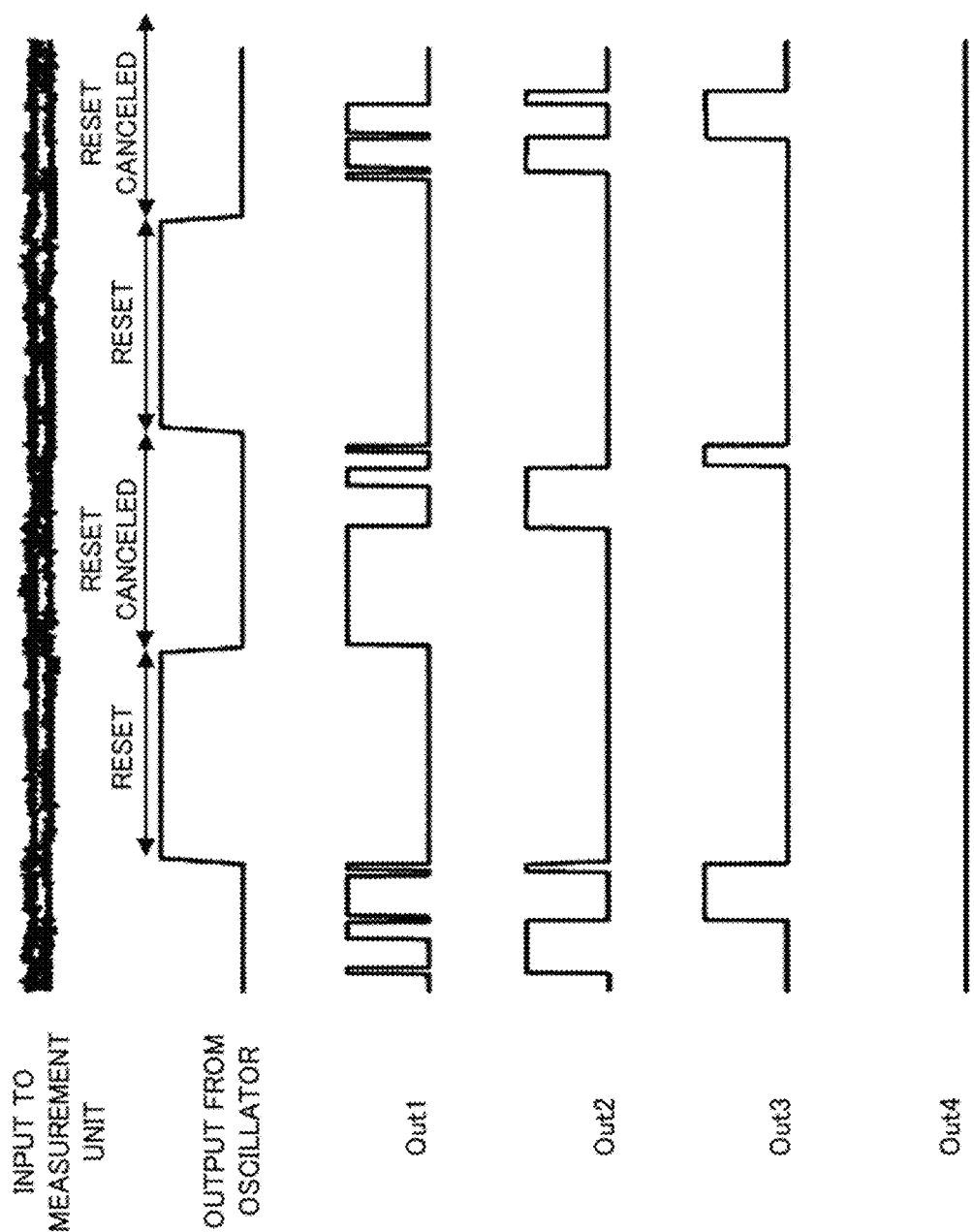
FIG. 4 shows a concrete example (No. 2) of the case where the count number is reset in the first embodiment.

FIG. 4 shows a concrete example (No. 2) of the case where the count number is reset in the first embodiment. The concrete example shown in FIG. 4 is a case where the pre-amplifier 300 outputs the signal based on the noise.

FIG. 4 indicates that the third differential signal based on the noise is inputted to the measurement unit 150. Further, FIG. 4 indicates that the measurement unit 150 outputs output signals such as the output signal Out1.

FIG. 4 indicates that the oscillator 160 transmits the signal for resetting the count number. For example, the measurement unit 150 resets the count number when the signal transmitted by the oscillator 160 is High. As above, when the measurement unit 150 receives the signal transmitted by the oscillator 160, the measurement unit 150 sets the count number at 0. After the interval in which the signal transmitted by the oscillator 160 is High ends, the measurement unit 150 starts the measurement.

As above, by the transmission of the signal by the oscillator 160, the count number is reset. As explained earlier, the count number is the same as the number of times detected by the comparison unit 170. Thus, when the count number turns to 0, the number of times detected by the comparison unit 170 turns to 0. For example, when the count number has turned to 0, the measurement unit 150 transmits a signal indicating that the count number is 0 to the comparison unit 170. When the comparison unit 170 receives the signal, the comparison unit 170 sets the detected number of times at 0.

The above description has been given of the case where the measurement unit 150 sets the count number at 0 when the measurement unit 150 receives the signal transmitted by the oscillator 160. The measurement unit 150 may set a value close to 0 as the count number. For example, the measurement unit 150 sets 1 as the count number.

Returning to FIG. 2, the function of the comparison unit 170 will be described below.

The comparison unit 170 acquires a count reference value selected by the reference value selection unit 400. The count reference value is a predetermined reference value. The count reference value is referred to also as a first reference value. The comparison unit 170 compares the number of times detected by the comparison unit 170 with the count reference value. In other words, the comparison unit 170 compares the count number with the count reference value. When the number of times detected by the comparison unit 170 and the count reference value coincide with each other, the comparison unit 170 outputs a signal indicating the coincidence to the signal output unit 180. When the number of times detected by the comparison unit 170 and the count reference value do not coincide with each other, the comparison unit 170 performs nothing.

When receiving the signal from the comparison unit 170, the signal output unit 180 outputs an SD signal. Here, the SD signal is a signal indicating that an optical signal has been received. The SD signal is referred to also as a second signal.

Here, the reset signal generation unit 500 will be described below. The reset signal generation unit 500 generates a reset signal as a signal for stopping the outputting of the SD signal. When the signal output unit 180 receives the reset signal from the reset signal generation unit 500, the signal output unit 180 stops the outputting of the SD signal.

Further, the signal output unit 180 outputs the SD signal when an optical signal close to the minimum reception sensitivity is inputted to the photodiode 200 and the signal output unit 180 receives the signal from the comparison unit 170 according to the above description, for example. By this operation, the condition "outputting the SD signal when an optical signal within a predetermined power range is received" is realized.

Here, when the number of times measured by the measurement unit 150 (i.e., the number of times detected by the comparison unit 170) by using the third differential signal based on the noise and the count reference value coincide with each other and the signal output unit 180 outputs the SD signal due to the coincidence, that means that the signal output unit 180 erroneously outputs the SD signal.

The time it takes until the number of times measured by the measurement unit 150 by using the third differential signal based on the noise and the count reference value coincide with each other may be regarded as the false detection time. The count number is reset due to the signal transmitted by the oscillator 160. Thus, the time it takes until the number of times measured by the measurement unit 150 by using the third differential signal based on the noise and the count reference value coincide with each other increases. Namely, the false detection time increases. The SD false detection frequency is represented as "1/(false detection time)". The increase in the false detection time serves as the lowering of the SD false detection frequency.

Thus, according to the first embodiment, the reception device 1 is capable of lowering the SD false detection frequency.

Further, even after the count number is reset by the oscillator 160 as shown in FIG. 3, the signal output unit 180 outputs the SD signal when the signal output unit 180 receives the signal from the comparison unit 170. Accordingly, the reception device 1 is capable of realizing "lowering the SD false detection frequency" and "outputting the SD signal when an optical signal within a predetermined power range is received".

The above description has been given of the case where the measurement unit 150 measures the count number by using the third differential signal. It is also possible for the measurement unit 150 to measure the count number by using the first differential signal. Namely, the measurement unit 150 may measure the number of times of intersection of the phase and the reverse phase as the reverse phase of the phase based on the first differential signal. As above, the reception device 1 does not necessarily have to include the first generation unit 130 and the second generation unit 140. With such a configuration, the cost for the reception device 1 is reduced.

Second Embodiment

Next, a second embodiment will be described below. The following description of the second embodiment will be given mainly of features different from those in the first embodiment, and the description is omitted for features in common with the first embodiment. FIGS. 1 to 4 are referred to in the second embodiment.

In the first embodiment, the description is given of the case where there is only one transmission rate of the optical signals. In the second embodiment, a description will be given of a case where there are a plurality of transmission rates of the optical signals.

Figure 5:
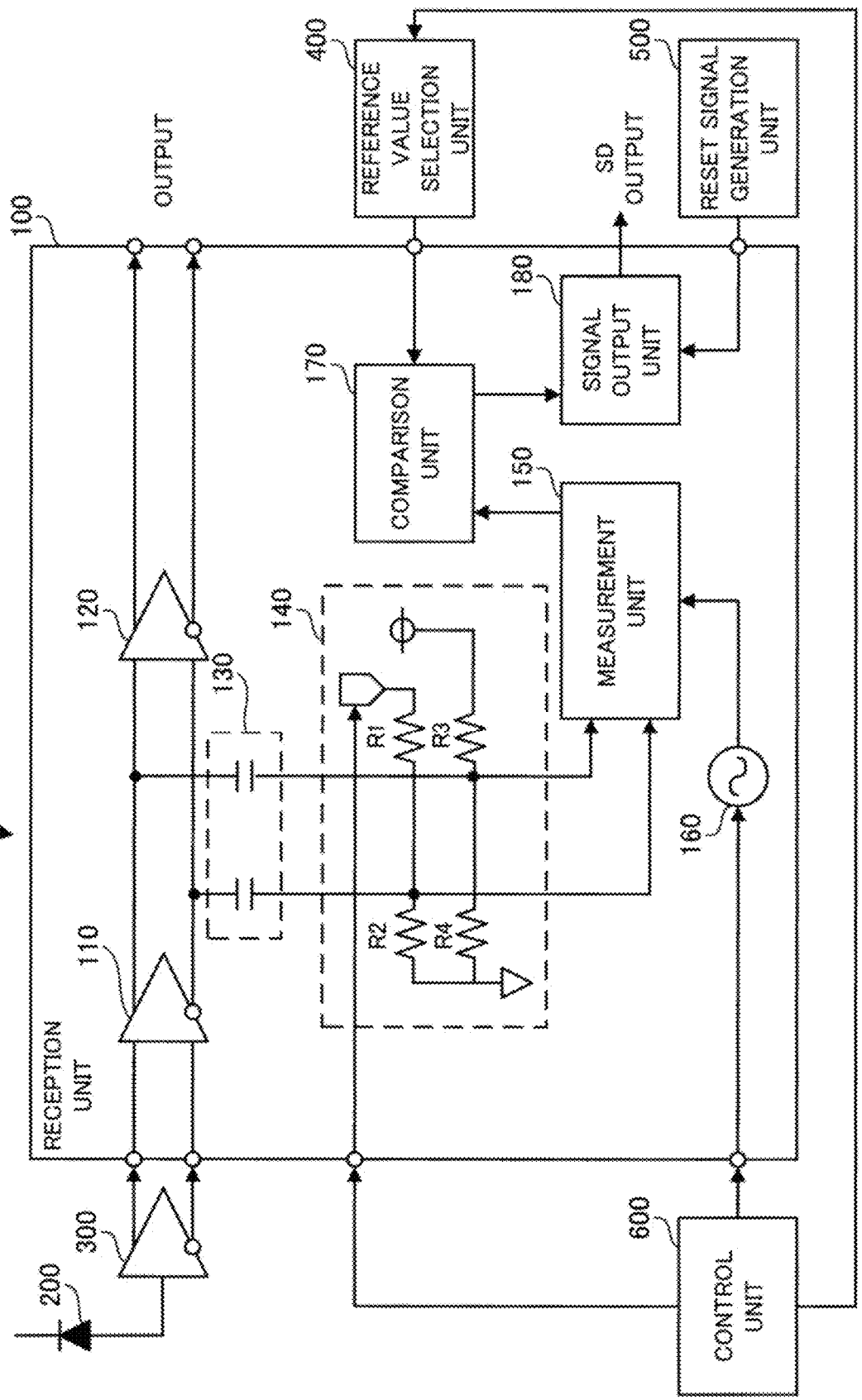
FIG. 5 is a functional block diagram showing the configuration of a reception device in a second embodiment.

FIG. 5 is a functional block diagram showing the configuration of a reception device in the second embodiment. Each component in FIG. 5 that is the same as a component shown in FIG. 1 is assigned the same reference character as in FIG. 1. The reception device 1 further includes a control unit 600.

Figure 6:
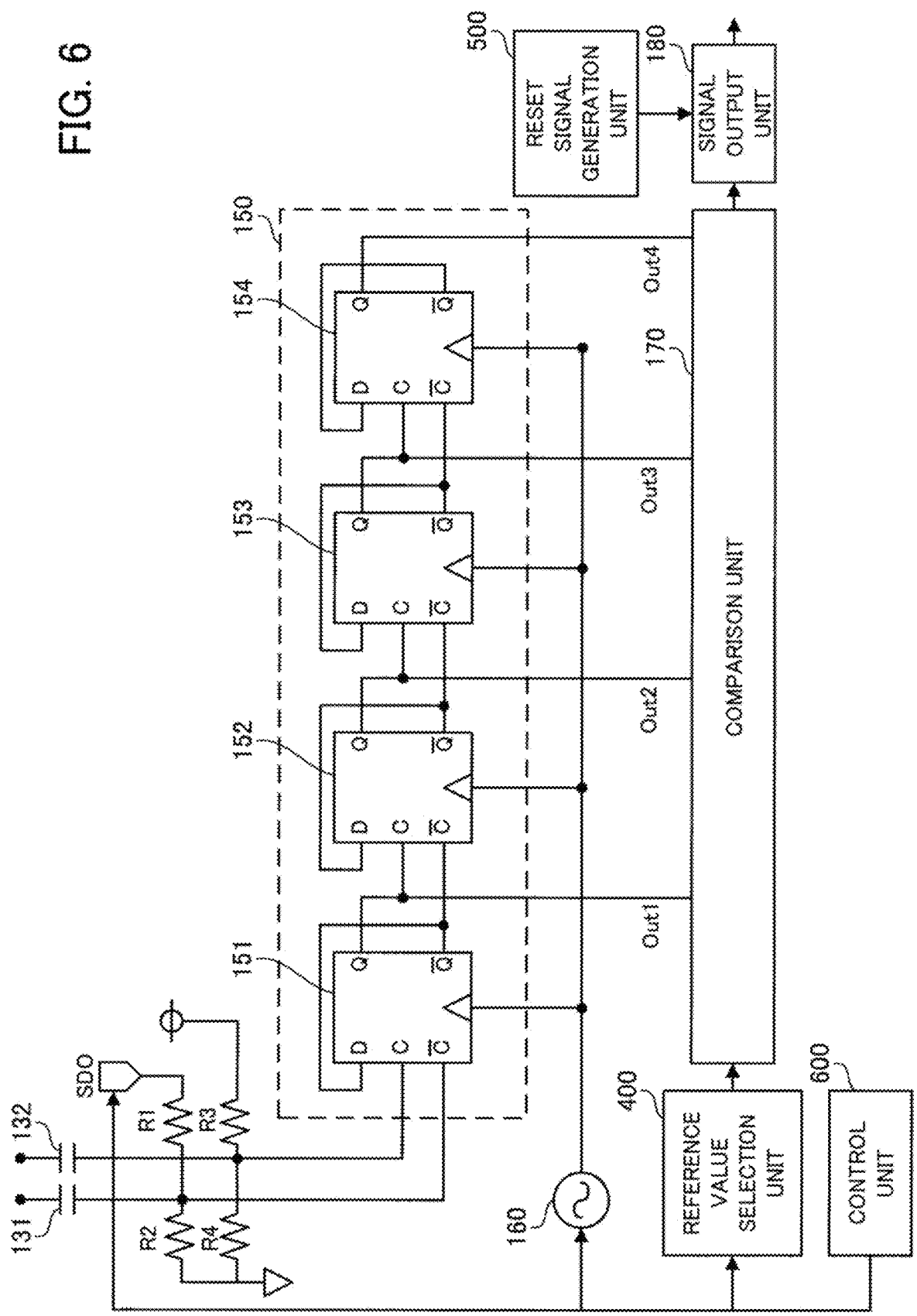
FIG. 6 is a diagram mainly showing the configuration of the measurement unit in the second embodiment.

FIG. 6 is a diagram mainly showing the configuration of the measurement unit in the second embodiment. The control unit 600 notifies the oscillator 160 of information indicating the transmission rate of an optical signal scheduled to be received by the reception device 1 among the plurality of transmission rates. Incidentally, it is also possible for the reception device 1 to acquire the information by means of an input operation performed by a user.

Here, when the count reference values corresponding to the plurality of transmission rates are set at the same value, it is necessary to vary the time for resetting the count number in regard to each of the transmission rates. Therefore, when the oscillator 160 receives the notification, the oscillator 160 transmits a signal at a frequency corresponding to the transmission rate of the optical signal scheduled to be received by the reception device 1. This signal may be regarded as the first signal or the third signal.

The control unit 600 may notify the reference value selection unit 400 of information indicating the transmission rate of the optical signal scheduled to be received by the reception device 1. When the reference value selection unit 400 receives the notification, the reference value selection unit 400 selects a count reference value corresponding to the transmission rate of the optical signal scheduled to be received by the reception device 1 from the plurality of count reference values. The reference value selection unit 400 provides the comparison unit 170 with the selected count reference value.

The control unit 600 may optimize the offset voltage in the second generation unit 140 depending on the transmission rate of the optical signal scheduled to be received by the reception device 1. For example, the control unit 600 increases the offset voltage with the increase in the value of the transmission rate.

According to the second embodiment, the reception device 1 is capable of lowering the SD false detection frequency even in a case where the reception device 1 is a device that receives optical signals at a plurality of transmission rates.

Third Embodiment

Next, a third embodiment will be described below. The following description of the third embodiment will be given mainly of features different from those in the first embodiment. In the third embodiment, the description is omitted for features in common with the first embodiment. FIGS. 1 to 4 are referred to in the third embodiment.

In the third embodiment, a description will be given of a case where a no-signal interval is detected. Incidentally, the no-signal interval means an interval in which no optical signal is inputted to the photodiode 200.

Figure 7:
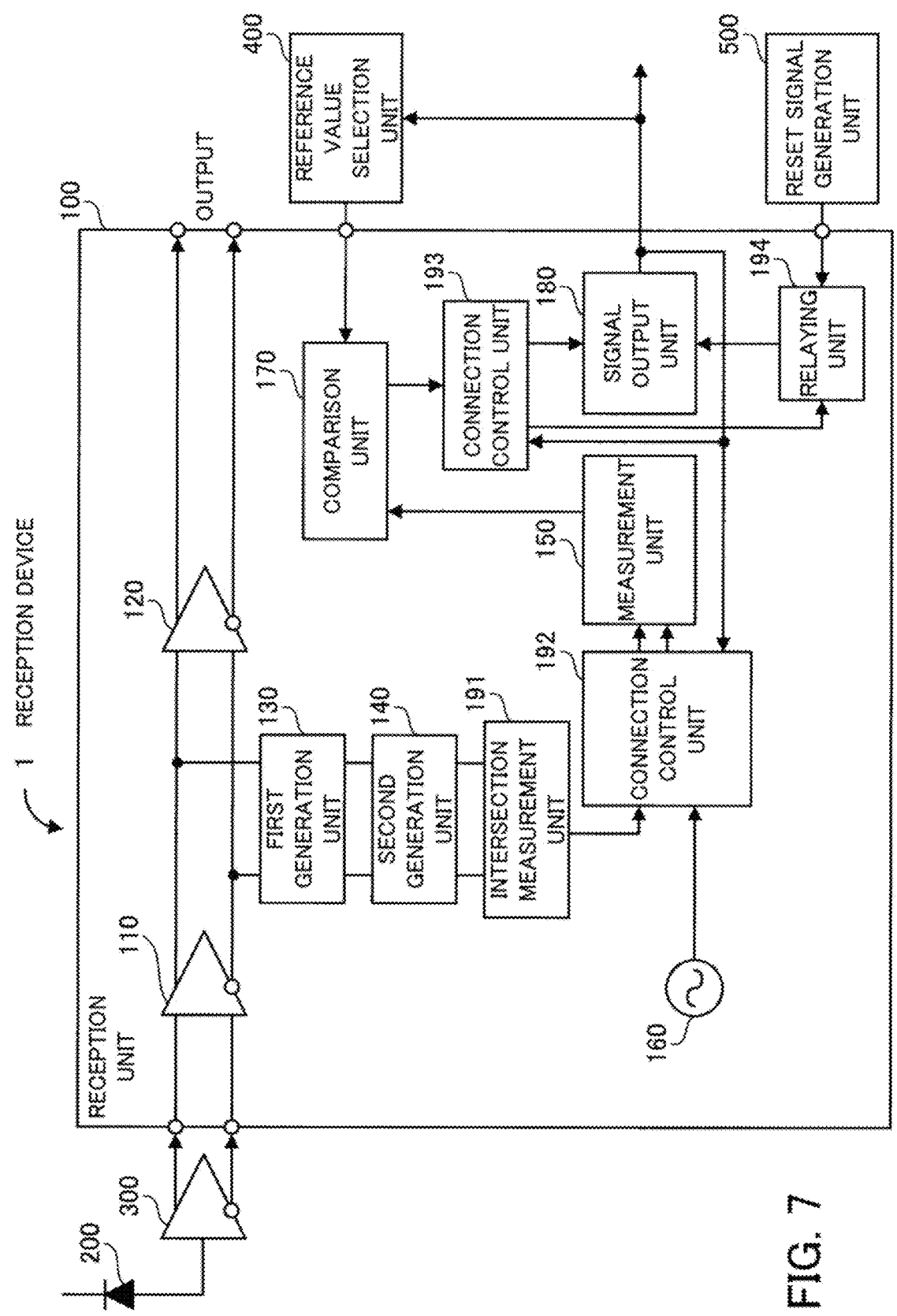
FIG. 7 is a functional block diagram showing the configuration of a reception device in a third embodiment.

FIG. 7 is a functional block diagram showing the configuration of a reception device in the third embodiment. The reception unit 100 further includes an intersection measurement unit 191, a connection control unit 192, a connection control unit 193 and a relaying unit 194. Incidentally, the relaying unit 194 may be referred to as a logical sum circuit. The intersection measurement unit 191, the connection control unit 192, the connection control unit 193 and the relaying unit 194 may be implemented by processing circuitries.

Next, the intersection measurement unit 191, the connection control unit 192, the connection control unit 193 and the relaying unit 194 will be described in detail below.

Figure 8:
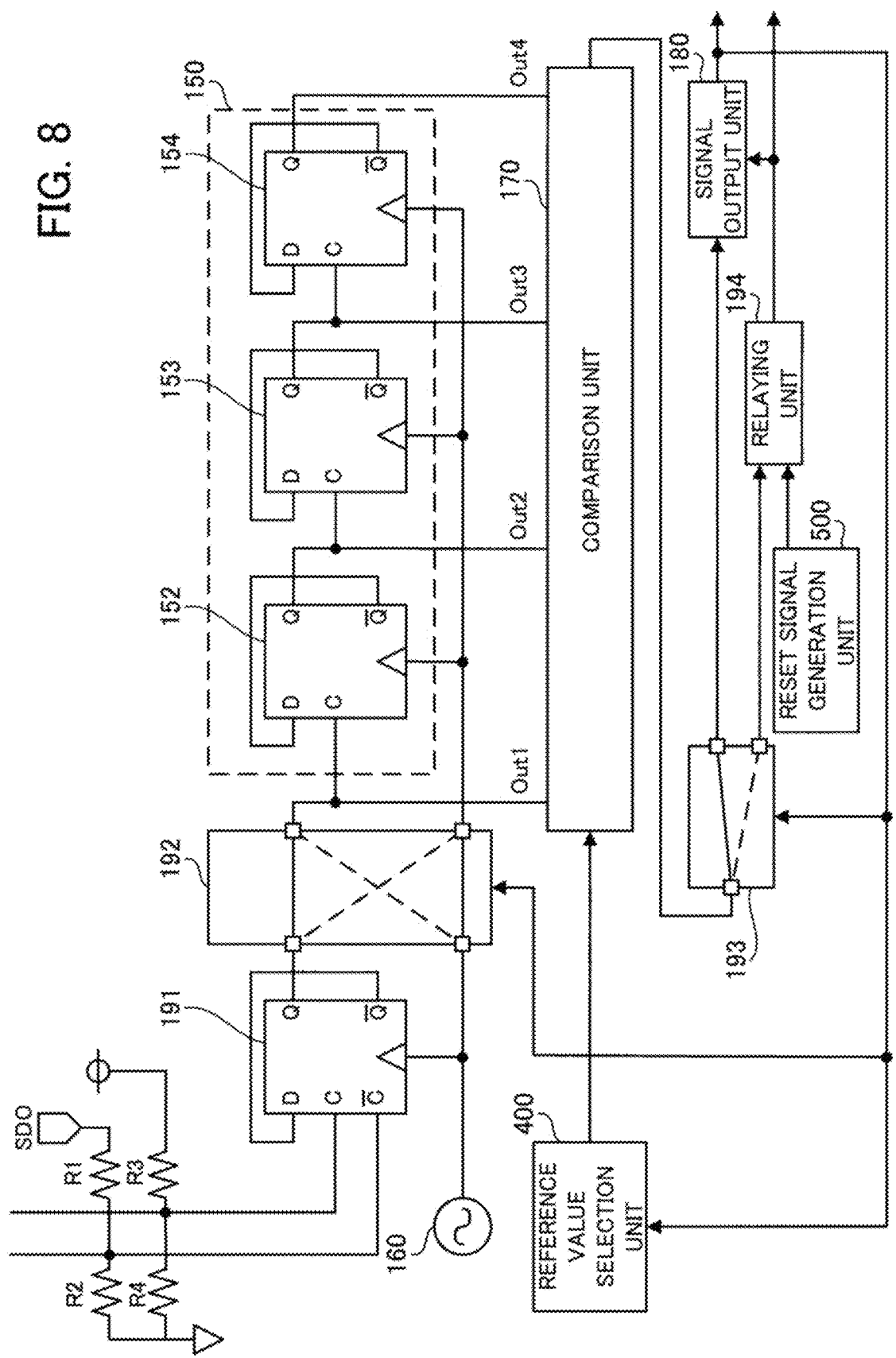
FIG. 8 is a diagram for explaining in detail components such as an intersection measurement unit in the third embodiment.

FIG. 8 is a diagram for explaining in detail components such as the intersection measurement unit in the third embodiment.

The measurement unit 150 includes the flip-flop circuit 152, 153 and 154.

The intersection measurement unit 191 measures the number of times of intersection of the phase and the reverse phase of the phase based on a differential signal obtained by amplifying the signal based on the optical signal. Specifically, when the third differential signal is inputted, the intersection measurement unit 191 measures the number of times of intersection of the phase and the reverse phase of the phase based on the third differential signal. The intersection measurement unit 191 outputs the output signal Out1 to the comparison unit 170 each time the phase and the reverse phase intersect twice. Incidentally, this number of times may be referred to as the second number of times.

The connection control unit 192 and the connection control unit 193 perform processing based on the signal outputted by the signal output unit 180. The functions of the connection control unit 192 and the connection control unit 193 will be described in detail later. The relaying unit 194 relays signals.

First, a case where an optical signal is received will be described below. In other words, a case where the SD signal is outputted will be described below. In a state before the SD signal is outputted, the signal output unit 180 is not outputting the SD signal. The signal output unit 180 outputs a signal (hereinafter referred to as a low signal) indicating that the signal output unit 180 is not outputting the SD signal.

When the low signal is detected by the connection control unit 192, the connection control unit 192 electrically connects the intersection measurement unit 191 and the measurement unit 150 together via the connection control unit 192. Further, when the low signal is detected by the connection control unit 192, the connection control unit 192 electrically connects the oscillator 160 and the measurement unit 150 together via the connection control unit 192.

When the low signal is detected by the connection control unit 193, the connection control unit 193 electrically connects the comparison unit 170 and the signal output unit 180 via the connection control unit 193.

When the low signal is detected by the reference value selection unit 400, the reference value selection unit 400 selects a count reference value. The reference value selection unit 400 notifies the comparison unit 170 of the count reference value.

When an optical signal is inputted to the photodiode 200, the intersection measurement unit 191 and the measurement unit 150 measure the number of times of intersection of the phase and the reverse phase of the phase based on the third differential signal (i.e., the count number).

The comparison unit 170 compares the count number with the count reference value. When the count number and the count reference value coincide with each other, the comparison unit 170 outputs the signal indicating the coincidence to the signal output unit 180 via the connection control unit 193. When the signal is received by the signal output unit 180, the signal output unit 180 outputs the SD signal. When the reset signal is received by the signal output unit 180, the signal output unit 180 stops the outputting of the SD signal. Incidentally, the reset signal is a signal outputted by the reset signal generation unit 500 via the relaying unit 194.

Further, when the measurement unit 150 receives the signal transmitted by the oscillator 160, the measurement unit 150 sets the count number at 0. Namely, the count number is reset. When the count number is reset, the measurement unit 150 transmits the signal indicating that the count number is 0 to the comparison unit 170. When the comparison unit 170 receives the signal indicating that the count number is 0, the comparison unit 170 sets the count numbers at 0. Namely, the comparison unit 170 not only sets the count number based on the output signal Out2, the output signal Out3 and the output signal Out4 at 0 but also sets the count number based on the output signal Out1 at 0.

As above, the reception device 1 is capable of implementing the first embodiment.

Next, the detection of a no-signal interval will be described below. In a state before a no-signal interval is detected, the signal output unit 180 is outputting the SD signal. In other words, the signal output unit 180 is outputting a high signal.

When the SD signal is detected by the connection control unit 192, the connection control unit 192 electrically connects the intersection measurement unit 191 and the oscillator 160 together via the connection control unit 192. Further, when the SD signal is detected by the connection control unit 192, the connection control unit 192 electrically connects the measurement unit 150 and the oscillator 160 together via the connection control unit 192. Incidentally, when the SD signal is detected by the connection control unit 192 may be expressed as when the SD signal is outputted.

When the SD signal is detected by the connection control unit 193, the connection control unit 193 electrically connects the comparison unit 170 and the signal output unit 180 together via the connection control unit 193 and the relaying unit 194.

When the SD signal is detected by the reference value selection unit 400, the reference value selection unit 400 selects a no-signal interval detection reference value. The no-signal interval detection reference value is a predetermined reference value. The no-signal interval detection reference value is referred to also as a second reference value. Incidentally, the no-signal interval detection reference value will be described in detail later. The reference value selection unit 400 notifies the comparison unit 170 of the no-signal interval detection reference value.

When the intersection measurement unit 191 receives the signal transmitted by the oscillator 160, the intersection measurement unit 191 sets the count number at 0. Namely, the count number is reset.

To the measurement unit 150, the signal transmitted by the oscillator 160 is inputted. The measurement unit 150 measures the number of times of transition of the signal. For example, the number of times of transition is the number of times the signal transitions upward or downward. As explained earlier, the count number measured by the intersection measurement unit 191 is reset. Thus, the measurement by the measurement unit 150 is measurement of an interval in which the intersection measurement unit 191 does not output the output signal Out1 (i.e., an interval in which no optical signal is inputted to the photodiode 200). The measurement of the interval in which no optical signal is inputted to the photodiode 200 is synonymous with measurement of the no-signal interval.

The comparison unit 170 compares the number of times of transition with the no-signal interval detection reference value. Here, an example of a method of determining the no-signal interval detection reference value will be described. It is desirable to determine the no-signal interval detection reference value so as to discriminate between a case where "0" continues due to Non Return to Zero when an optical signal is inputted to the photodiode 200 and a case where "0" as a signal value when there is no signal continues. First, the time for which "0" continues when an optical signal is inputted to the photodiode 200 (hereinafter referred to as a same sign duration time) has been stipulated by a standard or specification. The same sign duration time is assumed to be $X_{CIDA}$. The unit is second. Further, the cycle of the transmission of the signal by the oscillator 160 is assumed to be $X_{FREQ}$. The unit is second. The number measured by the measurement unit 150 increases by 1 every $X_{FREQ}$ seconds. The measured number is assumed to be $N_A$. The unit is time(s). Let $X_{NON}$ represent the no-signal interval, the relationship between the no-signal interval $X_{NON}$, the cycle $X_{FREQ}$ and the measured number $N_A$ is represented by the following expression (1): Incidentally, the unit of the no-signal interval is second.

$$X_{FREQ} \times (N_A-1) \leq X_{NON} \leq X_{FREQ} \times N_A \tag{1}$$

When the measured number $N_A$ (i.e., the number of times of transition) and the no-signal interval detection reference value coincide with each other, the comparison unit 170 outputs a signal indicating that a no-signal interval has been detected. Thus, it is desirable to set the no-signal interval detection reference value so that the comparison unit 170 outputs the signal when "no-signal interval $X_{NON}$>same sign duration time $X_{CIDA}$" holds.

As described above, the comparison unit 170 outputs the signal indicating that a no-signal interval has been detected when the number of times of transition and the no-signal interval detection reference value coincide with each other.

When the signal is received by the signal output unit 180, the signal output unit 180 outputs a signal indicating that a no-signal interval has been detected. In other words, the signal output unit 180 outputs the signal indicating that a no-signal interval has been detected when the number of times of transition and the no-signal interval detection reference value coincide with each other. The signal output unit 180 may output information indicating the no-signal interval (in other words, information indicating how many seconds the no-signal interval is). Further, the signal output unit 180 can use the signal as the reset signal.

According to the third embodiment, the reception device 1 is capable of detecting the no-signal interval.

Modification of Third Embodiment

In a modification of the third embodiment, a case where the second embodiment and the third embodiment are combined with each other will be described.

Figure 9:
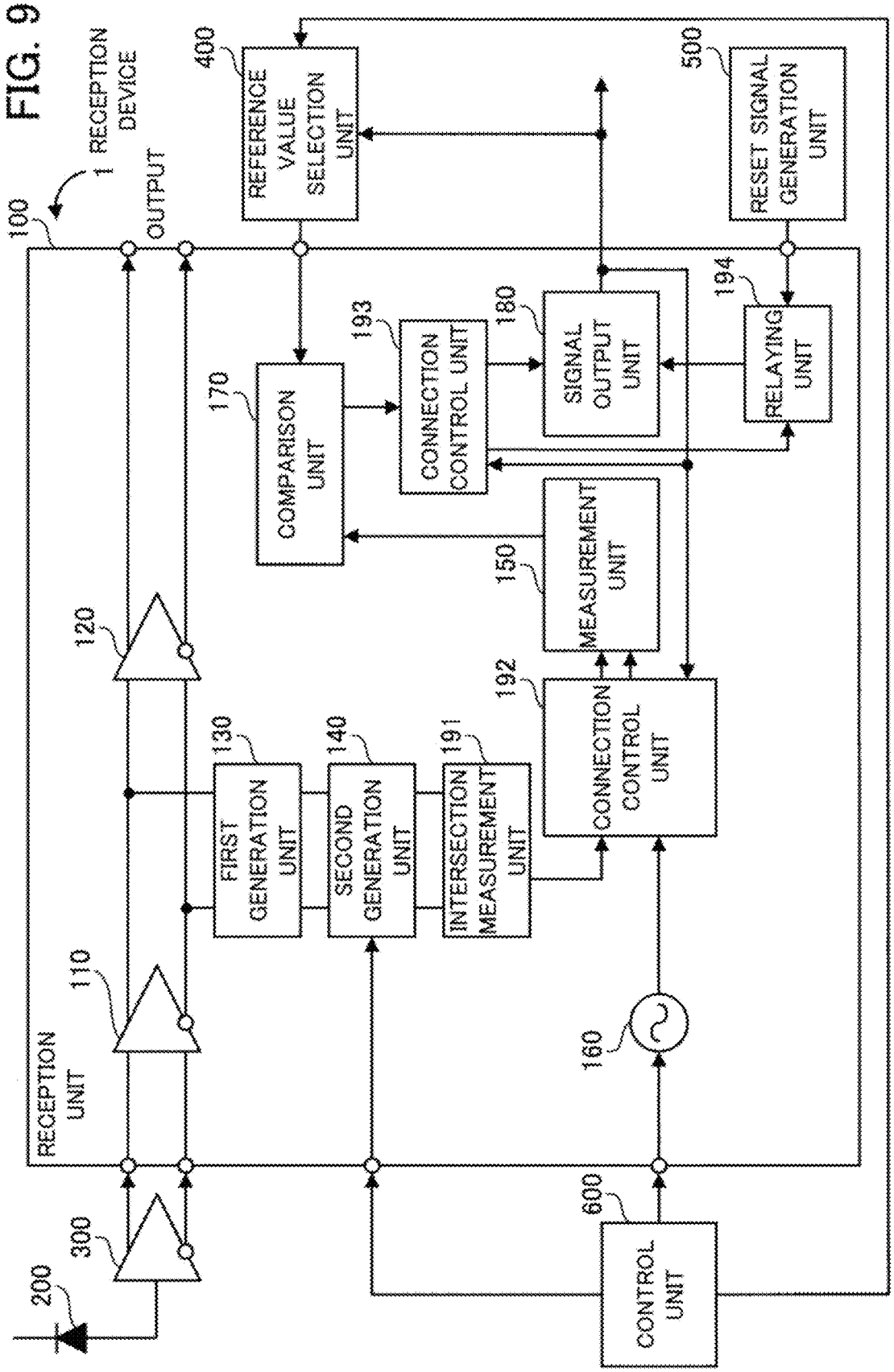
FIG. 9 is a functional block diagram showing the configuration of a reception device in a modification of the third embodiment.

FIG. 9 is a functional block diagram showing the configuration of a reception device in the modification of the third embodiment. The reception device 1 further includes the control unit 600.

Figure 10:
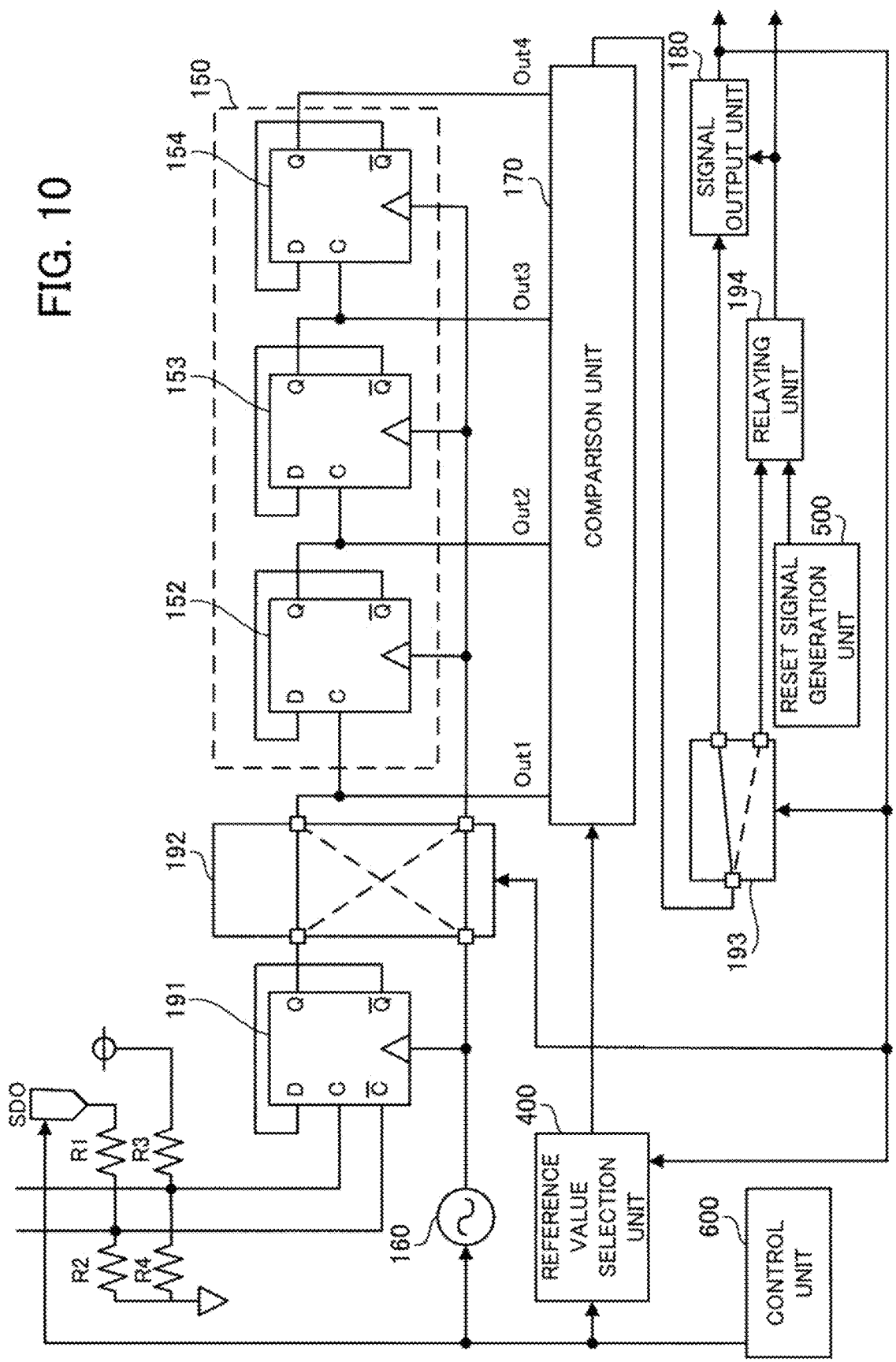
FIG. 10 is a diagram mainly showing the configuration of the measurement unit in the modification of the third embodiment.

FIG. 10 is a diagram mainly showing the configuration of the measurement unit in the modification of the third embodiment. Processing performed by the control unit 600 is the same as the processing performed by the control unit 600 in the second embodiment. Thus, description of the function of the control unit 600 is left out.

Advantages of the modification of the third embodiment are the same as the advantage of the second embodiment and the advantage of the third embodiment.

Features in the embodiments described above can be appropriately combined with each other.

DESCRIPTION OF REFERENCE CHARACTERS

1: reception device, 100: reception unit, 110: differential amplifier, 120: buffer amplifier, 130: first generation unit, 131, 132: capacitor, 140: second generation unit, 150: measurement unit, 151, 152, 153, 154: flip-flop circuit, 160: oscillator, 170: comparison unit, 180: signal output unit, 191: intersection measurement unit, 192: connection control unit, 193: connection control unit, 194: relaying unit, 200: photodiode, 300: pre-amplifier, 400: reference value selection unit, 500: reset signal generation unit, 600: control unit.

What is claimed is:

1. A reception device comprising:
    a measuring circuitry to measure a first number of times for which a first phase and a first reverse phase based on a differential signal obtained by amplifying a signal based on noise intersect with each other, the first reverse phase being a reverse phase of the first phase;
    an oscillator to transmit a first signal;
    a comparing circuitry to compare the first number of times with a predetermined first reference value; and
    a signal outputting circuitry to output a second signal indicating that an optical signal has been received when the first number of times and the first reference value coincide with each other,
    wherein the measuring circuitry resets the first number of times when the first signal is received.

2. The reception device according to claim 1, wherein the differential signal obtained by amplifying the signal based on the noise is a first differential signal, the reception device further comprises:
    a first generating circuitry to generate a second differential signal by removing a DC component included in the first differential signal; and a second generating circuitry to generate a third differential signal by applying a predetermined voltage to the second differential signal, and the measuring circuitry measures the first number of times based on the third differential signal.

3. The reception device according to claim 1, further comprising a controlling circuitry to notify the oscillator of information indicating a transmission rate of an optical signal scheduled to be received by the reception device among a plurality of transmission rates, wherein the oscillator transmits the first signal as a signal at a frequency corresponding to the transmission rate when the notification is received.

4. The reception device according to claim 1, further comprising a photodiode to receive the optical signal, wherein the oscillator transmits a third signal when the optical signal is received, the measuring circuitry measures a second number of times for which a second phase and a second reverse phase based on a differential signal obtained by amplifying a signal based on the optical signal intersect with each other when the optical signal is received and resets the second number of times when the third signal is received, the second reverse phase being a reverse phase of the second phase, the comparing circuitry compares the second number of times with the first reference value when the optical signal is received, and the signal outputting circuitry outputs the second signal when the optical signal is received and the second number of times and the first reference value coincide with each other.

5. The reception device according to claim 4, wherein
the differential signal obtained by amplifying the signal based on the optical signal is a first differential signal,
the reception device further comprises:
a first generating circuitry to generate a second differential signal by removing a DC component included in the first differential signal; and
a second generating circuitry to generate a third differential signal by applying a predetermined voltage to the second differential signal, and
the measuring circuitry measures the second number of times based on the third differential signal.

6. The reception device according to claim 4, further comprising a controlling circuitry to notify the oscillator of information indicating a transmission rate of an optical signal scheduled to be received by the reception device among a plurality of transmission rates, wherein the oscillator transmits the third signal as a signal at a frequency corresponding to the transmission rate when the notification is received.

7. The reception device according to claim 1, further comprising:
a photodiode to receive the optical signal;
a connection controlling circuitry; and
an intersection measuring circuitry, wherein
the connection control unit controlling circuitry connects the intersection measuring circuitry and the oscillator together and connects the measuring circuitry and the oscillator together when the second signal is detected,
the oscillator transmits a third signal when the optical signal is received,
the intersection measuring circuitry measures a second number of times for which a second phase and a second reverse phase based on a differential signal obtained by amplifying a signal based on the optical signal intersect with each other when the optical signal is received and resets the second number of times when the third signal is received, the second reverse phase being a reverse phase of the second phase,
the measuring circuitry measures a number of times of transition of the third signal when the optical signal is received,
the comparing circuitry compares the number of times of transition with a predetermined second reference value when the optical signal is received, and
the signal outputting circuitry outputs a signal indicating that a no-signal interval has been detected when the optical signal is received and the number of times of transition and the second reference value coincide with each other.

8. The reception device according to claim 7, wherein
the differential signal obtained by amplifying the signal based on the optical signal is a first differential signal,
the reception device further comprises:
a first generating circuitry to generate a second differential signal by removing a DC component included in the first differential signal; and
a second generating circuitry to generate a third differential signal by applying a predetermined voltage to the second differential signal, and
the intersection measuring circuitry measures the second number of times based on the third differential signal.

* * * * *